H. H. RIGGIN.
VALVE.
APPLICATION FILED NOV. 21, 1911.
1,020,449.
Patented Mar. 19, 1912.
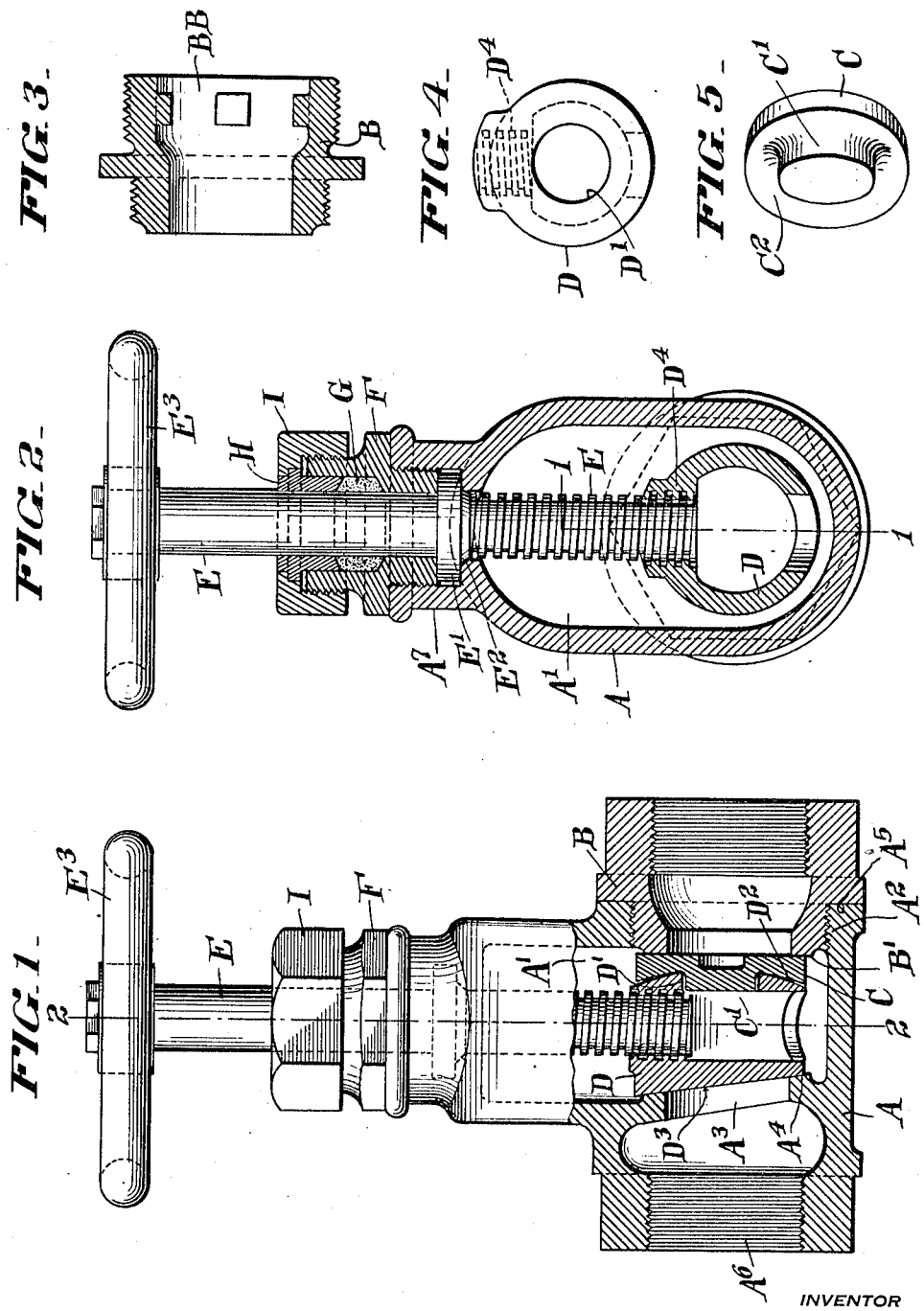

UNITED STATES PATENT OFFICE.

HENRY H. RIGGIN, OF ALTOONA, PENNSYLVANIA.

VALVE.

1,020,449.   Specification of Letters Patent.   Patented Mar. 19, 1912.

Application filed November 21, 1911. Serial No. 661,501.

*To all whom it may concern:*

Be it known that I, HENRY H. RIGGIN, a citizen of the United States of America, residing in the city of Altoona, county of Blair, in the State of Pennsylvania, have invented a certain new and useful Improvement in Valves, of which the following is a true and exact description, reference being had to the accompanying drawings, which form a part thereof.

My present invention relates to valves and particularly to valves of the kind commonly known as gate valves.

The object of my invention is to provide a simple and effective valve of the kind described characterized by certain features of construction and arrangement which make the valve relatively inexpensive to manufacture and permits repairs and renewals of worn parts to be easily and cheaply made.

The various features of novelty which characterize my invention are pointed out with particularity in the claims annexed to and forming a part of this specification.

For a better understanding of the invention, however, and the advantages possessed by it reference should be had to the accompanying drawings and descriptive matter in which I have illustrated and described forms in which my invention may be embodied.

Of the drawings, Figure 1 is an elevation of a complete valve partly in section on the line 1—1 of Fig. 2. Fig. 2 is a sectional elevation on the line 2—2 of Fig. 1. Fig. 3 is a sectional elevation of a modification of one of the parts of the valve shown in Figs. 1 and 2. Fig. 4 is an elevation of the valve disk carrier, and Fig. 5 is a perspective view of the valve disk.

In the drawings, A, represents the valve casing which is formed with a valve chamber $A'$ and with a threaded aperture $A^2$ opening to the valve chamber at one side.

B, represents an annular valve seat member removably screwed into the aperture $A^2$ and provided with a shoulder abutting against the annular surface $A^5$ surrounding the outer end of the aperture $A^2$. The valve casing is provided at its opposite side of the valve chamber from the aperture $A^2$ with a port $A^3$ which is surrounded at its inner end by a seat or wedging surface $A^4$ inclined to the plane of the valve seat $B'$, formed on the inner side of the valve seat member B. As shown, the casing member A and part B are internally threaded to receive pipe sections to be connected by the valve casing. It will be understood, however, that it is, in general, immaterial, how the valve casing is connected to the piping. For instance, the member B of Figs. 1 and 2 may be replaced by the member BB of Fig. 3 which has its outer end externally threaded to permit of its connection by an ordinary union coupling to the adjacent pipe sections.

To control the flow through the valve chamber, a valve proper is provided which comprises a valve disk member C and a valve disk carrier D. The valve disk C is formed with an outer face which engages the seat $B'$ of the valve seat member B when the valve is closed, and is formed on its rear side with a projection $C'$ loosely received in an aperture $D'$ formed in the carrier D. A rounded seat $D^2$ is provided against which the rounded surface $C^2$ of the valve disk bears when the valve is closed. The surfaces $D^2$ and $C^2$ are so shaped that the valve disk is free to adjust itself the slight amount required to insure proper seating of the valve disk against the seat B, and of the inclined rear face $D^3$ of the carrier D against the seat $A^4$. The diameter of the disk C is slightly less than the diameter of the valve seat member B so that when the latter is removed the disk can be readily moved out of the valve casing through the aperture $A^2$. Similarly the dimensions of the disk carrier D are such that it may also be removed from the valve chamber through the aperture $A^2$ when it is disconnected from the valve spindle E. The latter extends through the wall of the valve chamber and has an internally threaded portion normally in threaded engagement with the threaded socket $D^4$ of the carrier D. The valve spindle E is provided with a collar $E'$ external of the valve chamber proper. The collar $E'$ is normally engaged by the member G and the valve spindle thereby held against axial movement. The member G is screwed into the internally threaded socket $A^7$ formed on the valve casing and forms the body of a stuffing box receiving packings G surrounding the spindle E and held in place by the gland H. The latter is detachably connected to the member E as by the threaded cap member I. The valve spindle is provided at its outer end with a hand wheel $E^3$. The spindle E is provided at the inner end of the collar $E'$ with a conical portion $E^2$ adapted to engage a conical seat formed on the valve casing under certain conditions as hereinafter explained.

With the parts in the positions shown in Figs. 1 and 2, it will be apparent that the outer faces of the valve disk C and the carrier D seat against the corresponding seats $B'$ and $A^4$, so that the wedging action between the engaging surfaces insures the desired tightness of the joints. By rotating the valve spindle the carrier and valve disk are moved out of alinement with the ports controlled by them. Notwithstanding the readily detachable connection between the carrier and the valve disk, the wall of the valve chamber prevents displacement of these parts as the valve is opened and closed.

Lost motion is preferably provided in the threaded connection between the carrier D and the spindle E to permit proper seating of the carrier D against the seat $A^4$. In order to remove the valve disk C, as for regrinding, it is only necessary to unscrew the valve seat member B and then draw out the disk C. In order to remove the carrier D it is necessary to disengage the carrier from the spindle. This may be accomplished by unscrewing the member F from the valve casing and then rotating the spindle in the valve closing direction until the spindle leaves the socket $D^4$. The repacking of the valve spindle may be readily accomplished while the valve is in service and wide open. To accomplish this the valve spindle is rotated in the valve opening direction until the disk carrier D engages the upper wall of the valve chamber and the conical portion $E^2$ of the valve spindle is thereby forced snugly against the seat formed on the valve casing for that purpose whereupon the cap I may be removed and the packing G renewed without liability of appreciable leakage along the spindle.

It is one of the advantages of the construction disclosed that when the valve disk and valve seat member B are worn away by the grinding operations to which they are subjected from time to time, the consequent lost motion can in effect be taken up by facing off the shoulder $A^5$ which is advantageously initially shaped to permit of a considerable amount of this without weakening the valve casing.

While in accordance with the provisions of the statutes I have illustrated and described the best form of my invention now known to me, it will be apparent to those skilled in the art that changes may be made in the form of the apparatus disclosed without departing from the spirit of my invention, and that under some conditions certain features of my invention may be used with advantage without a corresponding use of other features.

Having now described my invention what I claim as new and desire to secure by Letters Patent, is:

1. In a valve of the kind described, the combination of a casing formed with a valve chamber and having an aperture at one side and a guide surface at the opposite side of said chamber, a valve seat member removably secured in said aperture and formed with a port surrounded at its inner end by a valve seat, said guide surface being inclined to said valve seat, and a valve movable transversely to said port into and out of position in which it wedges between said surface and seat and closes said port, said valve comprising two separable parts, one engaging said seat but removable through said aperture when said seat member is removed, and the second part engaging said surface, and provisions holding said parts together in normal operation while permitting said two parts to adjust themselves to said surface and seat.

2. In a valve of the kind described, the combination of a casing formed with a valve chamber and having an aperture at one side of said chamber and a guide surface at the opposite side, a valve seat member removably secured in said aperture and formed with a port surrounded at its inner end by a valve seat, said guide surface being inclined to said valve seat, and a valve movable transversely to said port into and out of position in which it wedges between said surface and seat and closes said port, said valve comprising two separable parts one engaging said seat but removable through said aperture when said seat member is removed, and the second part engaging said surface, one of said parts being formed with a projection extending transversely to said seat and the other with a socket receiving said projection whereby said parts are held together in normal operation while permitted freedom for relative adjustment and whereby said one part may be readily removed through said aperture when said valve seat member is removed.

3. In a valve of the kind described, the combination of a casing formed with a valve chamber and having an aperture at one side and a port at the opposite side of said chamber surrounded by a valve seat, a valve seat member removably secured in said aperture and formed with a port surrounded at its inner end by a valve seat, said valve seats being inclined to each other, and a valve movable transversely to said ports into and out of position in which it wedges between said seats and closes said ports, said valve comprising two separable parts, one engaging each seat and each removable through said aperture when said seat member is removed.

4. In a valve of the kind described, the combination of a casing formed with a valve chamber and having an aperture at one side and a port at the opposite side of said chamber and surrounded by a valve seat, a valve seat member removably secured in said aperture and formed with a port surrounded at its inner end by a valve seat, said valve seats being inclined to each other, and a valve movable transversely to said ports into and out of a position in which it wedges between said seats and closes said ports, said valve comprising two separable parts one engaging each seat and each removable through said aperture when said seat member is removed, provisions holding said parts together in normal operation while permitting said two parts to adjust themselves to said surface and seat.

5. In a valve of the kind described, the combination of a casing formed with a valve chamber and having an aperture at one side and a guide surface at the opposite side of said chamber, a valve seat member removably secured in said aperture and formed with a port surrounded at its inner end by a valve seat, said guide surface being inclined to said valve seat, and a valve movable transversely to said port into and out of a position in which it wedges between said surface and seat and closes said port, said valve comprising two separable parts one engaging said seat but removable through said apertures when said seat member is removed, and a second part engaging said surface, said parts having provisions holding them together in normal operation while permitting freedom for relative adjustment, and permitting said one part to separate from the other when said valve seat is removed.

6. In a valve of the kind described, the combination of a casing formed with a valve chamber and having an aperture at one side and a guide surface at the opposite side of said chamber and formed with a valve stem opening, a valve seat member removably secured in said aperture and formed with a port surrounded at its inner end by a valve seat, said guide surface being inclined to said valve seat, and a valve movable transversely to said port into and out of a position in which it wedges between said surface and seat and closes said port, said valve comprising two separable parts, one engaging said seat but removable through said aperture when said seat member is removed, and a second part engaging said surface, said parts having provisions holding them together in normal operation while permitting freedom for relative adjustment, and permitting said one part to separate from the other when said valve seat is removed, a valve stem passing through said valve stem opening and having a threaded engagement with said second valve part and means normally holding said stem against axial movement but adjustable to permit such movement when it is desired to separate said stem and second part.

7. In a valve of the kind described, the combination of a casing formed with a valve chamber and having an aperture at one side and a guide surface at the opposite side of said chamber and formed with a valve stem opening, a valve seat member removably secured in said aperture and formed with a port surrounded at its inner end by a valve seat, said guide surface being inclined to said valve seat, and a valve movable transversely to said port into and out of a position in which it wedges between said surface and seat and closes said port, said valve comprising two separable parts, one engaging said seat but removable through said aperture when said seat member is removed, and a second part engaging said surface, said parts having provisions holding them together in normal operation while permitting freedom for relative adjustment, and permitting said one part to separate from the other when said valve seat member is removed, and a valve stem passing through said valve stem opening and having a threaded engagement with said second part, said stem being provided exterior of said chamber with a collar and said casing being formed with a seat surrounding said second aperture against which said collar may be drawn by rotating said stem in the valve opening direction and means connected to but separable from said chamber normally engaging said collar to prevent axial movement of said stem.

8. In a valve of the kind described the combination of a casing formed with a valve chamber and a threaded aperture at one side, and a guide surface at the opposite side of said chamber and formed with an external raised boss surrounding the outer end of said aperture, a valve seat member having a threaded portion entering said aperture and a shoulder abutting against the outer end of said boss, said member having a port formed through it surrounded at its inner end by a valve seat, said guide surface being inclined to said valve seat, and a valve movable transversely to said port into and out of position in which it wedges between said surface and seat and closes said port, said valve comprising two separable parts, one engaging said seat and removable through said aperture when said seat member is removed and the other parts engaging said surface, and provisions holding said parts together in normal operation while permitting said parts to adjust themselves to said surface and seat.

HENRY H. RIGGIN.

Witnesses:
J. P. GRAHAM,
ANNIE K. MILLER.

Copies of this patent may be obtained for five cents each, by addressing the "Commissioner of Patents, Washington, D. C."